June 3, 1941.  A. D. BLUMLEIN  2,243,893
ELECTROMAGNETIC COIL
Filed Sept. 9, 1937
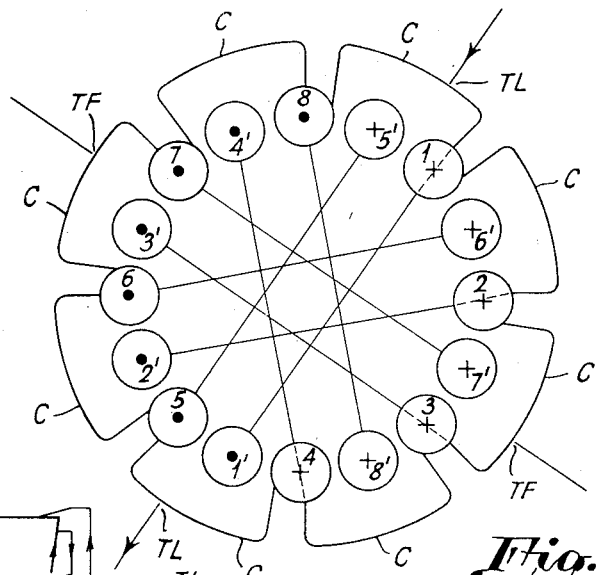
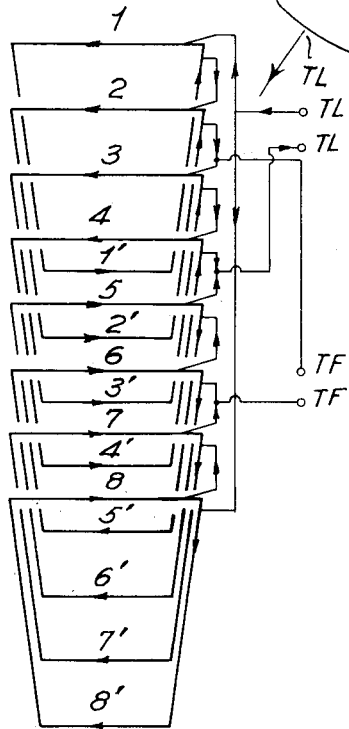
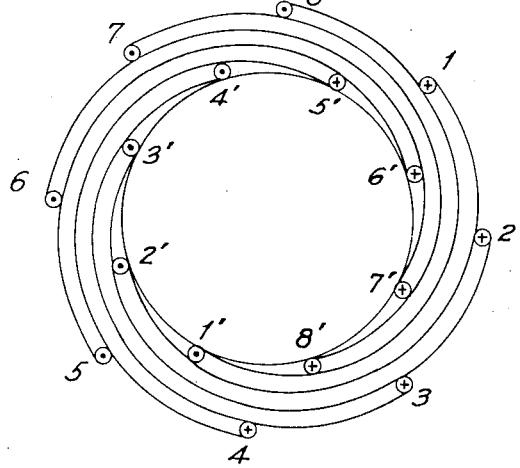
INVENTOR
ALAN D. BLUMLEIN
ATTORNEY Patented June 3, 1941

2,243,893

UNITED STATES PATENT OFFICE 2,243,893

ELECTROMAGNETIC COIL

Alan Dower Blumlein, London, England, assignor to Electric & Musical Industries Limited, Hayes, Middlesex, England, a company of Great Britain Application September 9, 1937, Serial No. 162,970
In Great Britain September 21, 1936

2 Claims. (Cl. 250—157)

This invention relates to electromagnetic coils and has particular reference to the deflecting coils for cathode ray tubes used in television and similar systems, or for measuring purposes.

A cathode ray tube is usually provided with either electrostatic or electromagnetic means for deflecting the cathode ray and causing it to trace out a desired path on a fluorescent or other screen associated with the tube. In the case of electromagnetic means, two coils or two pairs of coils are arranged to produce deflection of the cathode ray in two directions at right angles to each other. Currents of sawtooth wave form, one having a frequency corresponding to the line scanning frequency and another corresponding to the framing frequency are passed through the coils and the picture field or raster is thus built up on the tube screen.

Accordingly, one of the objects of the present invention is to provide compactness of construction in the coil system of a cathode ray tube and to effect economy in the provision of coils.

According to the present invention the turns of a single electromagnetic deflecting coil system for a cathode ray tube are disposed in such a manner that horizontal and deflecting fields are set up on the application of energizing currents to tapping points in said coil so chosen that a current entering or leaving by one pair of tapping points produces a field at right angles to that produced by current entering or leaving another pair of tapping points. In the case of a deflecting coil system for a cathode ray tube to be used in a television system, the turns are disposed in such a manner that deflecting forces corresponding to desired line and frame deflections respectively are applied to tapping points in said coil so chosen that a current entering or leaving by one pair of tapping points produces a field at right angles to that produced by current entering or leaving another pair of tapping points.

The coil may be provided with an electromagnetic flux distributing member so shaped that the concentration of the magnetic flux in the central region of the field set up by the coil is decreased. Alternatively, a substantially uniform field may be produced by distributing the coil turns in such a manner that the current flowing in a given turn due to current controlling one direction of scan is opposite in direction to that flowing in the immediate adjacent turns.

In order that the invention may be more clearly understood and readily carried out, a form of the coil system arranged in accordance with the invention will now be described by way of example with reference to the drawing in which:

Fig. 1 is a schematic diagram.

Fig. 2 shows a developed form illustrating the lay-out of the windings.

Fig. 3 is a cross-section of the completed coil assembly showing how the individual sets of turns lie upon each other.

Referring to that drawing, a ray deflecting coil system is shown diagrammatically in Fig. 1, eight similar coils being connected together in a manner generally similar to that of a polyphase winding of a two-pole electric motor. The circles I and I' represent the wires of a coil seen looking along the axis of a cathode ray tube. The line joining I and I' represents the ends of the coil which is drawn for simplicity as crossing straight through the cathode ray tube. In practice the ends of the coils must be passed round the tube outside the glass envelope, one side of the coil is made shorter than the other, the coil when laid flat being trapezoidal in form. The end turns are turned radially out from the short side of the coil and return round the cathode ray tube to the long side.

The coil ends are brought out on one side of each coil as indicated at the circles, I, 2—8. The other sides of the coils represented by the circles I', 2'—8' receive current through the end turns. The wire entering centrally into the circle representing the coil, passes vertically through the plane of the paper and is bent around the tube at the end of the coil, returning through the plane of the paper to a corresponding circle on the outer side of the coil.

It will be seen from the drawing that the pitch of each coil is just short of 190°, the mean pitch in the particular example shown being 157.5°. Tappings TL are taken at diametrically opposite points for the introduction of one of the scanning currents and the other scanning currents are introduced at the tappings TF at right angles. Assuming that one scanning current enters and leaves as shown by the arrows, the currents in the coil sides will be as indicated by the crosses and dots. The crosses represent current leaving the observer and the dots current coming towards the observer. It will be seen that in all coils on the right between 5' and 4 inclusive, the currents are leaving the observer and in the case of the remaining eight coils the current is coming towards the observer. Thus, a magnetic field will be produced along the direction of the diameter passing between I', 4 on one side and 8, 5' on the other. Similarly currents introduced at the other two tapping points will produce a magnetic field at right angles.

The coil system is provided with a magnetic core not shown in the drawing, but which is in the form of iron wire wound around the outside of the coils. If a uniform magnetic core is used, however, the coil arrangement described will not produce uniform magnetic flux in the space desired, the particular current distribution shown producing too strong a field in the center of the space. One way of obviating this difficulty is to shape the iron core so as to be more remote from the coil sides 8, 5', 4 and 1' than it is from the other coil sides, and in that case there would be a reduction of the central flux. Also in the case of the flux set up by the second scanning current, the iron core must be removed from the neighborhood of coils 2, 7', 3' and 6. This latter adjustment would not seriously affect the flux for the scanning direction marked on the drawing. The suggested formation of the iron core would result in its having an approximately square shape and this could be produced by placing pieces of padding over the coils at appropriate places before winding on an iron wire coil. The pieces of padding may usefully serve as blocks for terminals connected to the coils.

An alternative method of producing uniformity of flux lies in altering the pitch of the coils. Thus in the example described reduction of coil pitch from 157.5 degs. to 112 degs. would result in the following sequence of current production in the coils:

. x x x x x x . x. . . . . x

Such an arrangement would tend to produce a more uniform field than that shown in the arrangement illustrated in the drawing, although the scanning efficiency would be lower On the other hand, the arrangement described might in practice be found to effect slight over correction for the arrangement shown in the drawing. If twelve coils instead of eight were employed, the coil pitch corresponding to the arrangement shown in the drawing would be 165° whereas in the case of an improved arrangement giving a more uniform field, the coil pitch would be 135°. It is of course clear that the method may be applied for any number of coils.

While in the example described the coils have circular sides, such a shape is not essential and the coils may be wound on formers designed to give the coils a segmental shape so that they will fit neatly together and occupy a minimum amount of space. The coils may be shaped to fit cylindrical, conical or other shaped cathode ray tubes.

Referring to Fig. 2 each trapezium shown represents a coil which consists of many turns, the cross-section of the horizontal portions being shown as circles in Fig. 1. In order to form these coils into a cylinder, the end 1 is folded down and under, then the end 8' is similarly folded down and under so that the end 1 falls between the ends 5' and 6', the end 2 falls between the ends 6' and 7', and the end 3 between the ends 7' and 8'. The breaks shown in the sides of the coil turns indicate that they pass under the long horizontal portions, the arrangement being obtained for the whole coil if bent in the order stated.

The connections between the coils are shown at the right hand side and indicate the direction of winding with reference to the various connections. The long lead connecting the coil portions 1 and 8 is only diagrammatic due to the coil being shown in the developed form, and when the coils are folded to form a cylinder this connection will be as short as the others. The arrowheads represent the direction of flow of the line deflecting currents applied at the terminals TL.

Referring to Fig. 3 there is shown a cross-section of the completed coil assembly showing how the individual sets of turns lie upon each other. Similar reference numerals in this figure refer to the same parts as those in Figs. 1 and 2.

Having now particularly described and ascertained the nature of my said invention and in what manner the same is to be performed, I declare that what I claim is:

1. A cathode ray tube system including means for developing and accelerating a cathode ray beam, an electro-magnetic deflecting system for deflecting the beam comprising a single coil composed of a plurality of individual sections each having a plurality of turns, all of said individual sections being serially connected, and means for impressing currents onto said coils at tapped portions thereof whereby the cathode ray beam may be deflected in two co-ordinates of motion by a single coil structure.

2. Apparatus in accordance with claim 1, wherein said individual coil sections are concentrically wound.

ALAN DOWER BLUMLEIN.